(12) United States Patent
Fujii et al.

(10) Patent No.: US 12,378,676 B2
(45) Date of Patent: Aug. 5, 2025

(54) GRAIN-ORIENTED ELECTRICAL STEEL SHEET AND MANUFACTURING METHOD OF THE SAME

(71) Applicant: NIPPON STEEL CORPORATION, Tokyo (JP)

(72) Inventors: Hiroyasu Fujii, Tokyo (JP); Seiki Takebayashi, Tokyo (JP); Yoshiyuki Ushigami, Tokyo (JP); Takashi Kataoka, Tokyo (JP); Shunsuke Okumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 910 days.

(21) Appl. No.: 17/422,401

(22) PCT Filed: Jan. 16, 2020

(86) PCT No.: PCT/JP2020/001156
§ 371 (c)(1),
(2) Date: Jul. 12, 2021

(87) PCT Pub. No.: WO2020/149328
PCT Pub. Date: Jul. 23, 2020

(65) Prior Publication Data
US 2022/0119958 A1     Apr. 21, 2022

(30) Foreign Application Priority Data

Jan. 16, 2019   (JP) .................................. 2019-005131

(51) Int. Cl.
*C23C 22/78*   (2006.01)
*C21D 3/04*   (2006.01)
(Continued)

(52) U.S. Cl.
CPC ................. *C23C 22/78* (2013.01); *C21D 3/04* (2013.01); *C21D 8/0205* (2013.01);
(Continued)

(58) Field of Classification Search
CPC ......... C23C 22/78; C23C 22/74; C23C 22/00; C23C 22/33; C23C 22/07; C21D 3/04;
(Continued)

(56) References Cited

U.S. PATENT DOCUMENTS 3,785,882 A   1/1974 Jackson
3,856,568 A   12/1974 Tanaka et al.
(Continued)

FOREIGN PATENT DOCUMENTS

EP   0577124 A2 *   1/1994   ............... C21D 8/12
JP   48-19050 B       6/1973
(Continued)

*Primary Examiner* — Danielle M. Carda
(74) *Attorney, Agent, or Firm* — Birch, Stewart, Kolasch & Birch, LLP

(57) ABSTRACT

This grain-oriented electrical steel sheet includes a steel sheet, an insulation coating disposed on the steel sheet, and a spinel present at a part on the steel sheet at an interface between the steel sheet and the insulation coating by being fitted into the insulation coating, in which an amount of the spinel is 5 to 50 mg/m² per unit area of a surface of the steel sheet.

5 Claims, 2 Drawing Sheets

(51) Int. Cl.
  *C21D 8/02* (2006.01)
  *C21D 9/46* (2006.01)
  *C22C 38/00* (2006.01)
  *C22C 38/02* (2006.01)
  *C22C 38/06* (2006.01)

(52) U.S. Cl.
  CPC ......... *C21D 8/0226* (2013.01); *C21D 8/0236* (2013.01); *C21D 8/0273* (2013.01); *C21D 9/46* (2013.01); *C22C 38/001* (2013.01); *C22C 38/002* (2013.01); *C22C 38/02* (2013.01); *C22C 38/06* (2013.01); *C21D 2201/05* (2013.01)

(58) Field of Classification Search
  CPC ........ C21D 8/0205; C21D 9/46; C21D 6/008; C21D 1/04; C21D 8/1272; C21D 8/1283; C21D 8/1288; C21D 2201/05; C21D 8/0226; C21D 8/0236; C21D 8/0273; H01F 1/18; H01F 1/147; C22C 38/00; C22C 38/001; C22C 38/002; C22C 38/02; C22C 38/06; C22C 38/008; C22C 38/04; C22C 38/16
  USPC ........................................................ 148/243
  See application file for complete search history.

(56) References Cited

U.S. PATENT DOCUMENTS

| | | | |
|---|---|---|---|
| 3,932,236 A | 1/1976 | Wada et al. | |
| 4,255,205 A | 3/1981 | Morito et al. | |
| 4,367,100 A | 1/1983 | Miller, Jr. | |
| 5,565,272 A * | 10/1996 | Masui ................ | H01F 1/14783 148/309 |
| 2003/0188806 A1 * | 10/2003 | Fujii .................... | C21D 8/1283 148/112 |
| 2016/0260531 A1 | 9/2016 | Terashima et al. | |

FOREIGN PATENT DOCUMENTS

| | | |
|---|---|---|
| JP | 48-39338 A | 6/1973 |
| JP | 49-96920 A | 9/1974 |
| JP | 56-3414 B2 | 1/1981 |
| JP | 56-65983 A | 6/1981 |
| JP | 58-44152 B2 | 10/1983 |
| JP | 59-96278 A | 6/1984 |
| JP | 6-017261 A | 1/1994 |
| JP | 7-18457 A | 1/1995 |
| JP | 8-134660 A | 5/1996 |
| JP | 4184809 B2 | 11/2008 |
| JP | 4473489 B2 | 6/2010 |
| JP | 2018-62682 A | 4/2018 |
| WO | WO 2015/064472 A1 | 5/2015 |

* cited by examiner

GRAIN-ORIENTED ELECTRICAL STEEL SHEET AND MANUFACTURING METHOD OF THE SAME

TECHNICAL FIELD

The present invention relates to a grain-oriented electrical steel sheet and a manufacturing method of the same. Priority is claimed on Japanese Patent Application No. 2019-005131 filed in Japan on Jan. 16, 2019, the content of which is incorporated herein by reference.

BACKGROUND ART

Grain-oriented electrical steel sheets (grain-oriented silicon steel sheets) are frequently used as iron core materials for transformers. Transformers are used continuously for a long period of time from installation to disposal, and continuous energy loss is caused. Therefore, a material having small iron loss is required as an iron core material to reduce energy loss. In reducing iron loss, it is effective to apply tension to a steel sheet. Therefore, reduction in iron loss has been achieved by forming a coating made of a material having a smaller thermal expansion coefficient compared to that of a steel sheet at a high temperature and applying tension generated at the time of cooling due to a difference in thermal expansion coefficient to the steel sheet. As the above-described coating, there is a forsterite film formed when oxides on a surface of the steel sheet react with an annealing separator containing MgO in a final annealing process. The forsterite film can apply tension to the steel sheet and is also excellent in coating adhesion.

Therefore, forming an insulation coating mainly composed of phosphate after leaving the forsterite film generated in the final annealing process has been a normal manufacturing method of a grain-oriented silicon steel sheet.

In order to apply tension to a steel sheet for reducing iron loss, for example, Patent Document 1 discloses a method of forming an insulation coating in which a surface of the steel sheet is coated with a coating liquid mainly composed of colloidal silica and phosphate on a forsterite film and then is baked.

However, in recent years, it has become clear that a disordered interface structure between a forsterite film and a base steel diminishes an effect of improving iron loss due to the film tension to some extent. Therefore, for example, as disclosed in Patent Document 2, a technology that attempts further reduction in iron loss by forming a tension film again after removing the forsterite film generated in a final annealing process or further performing a mirror finishing has been proposed.

However, it takes much effort to remove the forsterite film formed in a form in which it is fitted to the steel sheet side. For example, in the case of trying to remove the forsterite film by pickling, since the forsterite contains a silica component, a strong acid solution such as hydrofluoric acid that can also dissolve the silica component is required as an acid solution, and the forsterite film needs to be immersed in the acid solution for a long period of time. Also, in a case of removing the forsterite film by means such as mechanical surface grinding, it is necessary to grind nearly 10 μm to completely remove up to the fitted portion and this is difficult to employ from the perspective of yield. Further, the method of removing the film by grinding has a drawback in that it inevitably introduces strain on the steel sheet side during the grinding, and thereby causes deterioration in magnetic characteristics.

Therefore, various technologies that do not allow a film of an inorganic mineral substance such as forsterite to be formed during final annealing have been studied in place of the method of removing the forsterite formed in the final annealing process after the annealing. Among them, alumina has attracted attention as an annealing separator in which oxides do not easily remain after final annealing, and various technologies using an annealing separator mainly composed of alumina have been proposed.

For example, Patent Document 3 discloses a method of using alumina having a purity of 99% or more and a grain size of 100 mesh to 400 mesh as an annealing separator. Also, Patent Document 4 discloses a method using an annealing separator mainly composed of aluminum hydroxide. Also, Patent Document 5 discloses a method of using an annealing separator obtained by adding an alkali metal compound containing a boric acid component to alumina.

Further, Patent Document 6 discloses a method using an annealing separator containing 5 to 40% of hydrous silicate mineral powder and the balance being alumina. Patent Document 7 discloses a technology using an annealing separator containing 0.2 to 20% of a compound of strontium or barium, and 2 to 30% of calcia or calcium hydroxide in addition to the hydrous silicate mineral powder, and the balance being alumina. Further, Patent Document 8 also discloses a method in which fine-grained alumina having an average grain size of 1 μm or less is mixed with coarse-grained alumina having an average grain size of 1 μm to 50 μm to be used.

The above-described disclosed technologies mainly based on alumina often specify grain sizes of alumina. On the other hand, Patent Document 9 discloses an annealing separator in which 15 to 70 parts by weight of inert magnesia having a specific surface area of 0.5 to 10 $m^2/g$ that has been calcined at 1300° C. or higher and pulverized is added to 100 parts by weight of alumina.

If the above-described technologies are applied and a decarburization-annealed sheet is subjected to final annealing, an effect of preventing formation of the forsterite film is recognized to some extent. However, it has been difficult to stably obtain a final-annealed sheet in which a forsterite film is not formed and oxides do not remain.

In response to such a problem, Patent Document 10 discloses a method for stably obtaining a final-annealed sheet in which a forsterite film is not formed and oxides do not remain. The technology of Patent Document 10 describes that residual oxides can be suppressed when a powder formed of alumina with a calcination temperature of 900 to 1400° C. and a γ ratio of 0.001 to 2.0 and unavoidable impurity elements is used as an annealing separator.

According to the method disclosed in Patent Document 10, a final-annealed sheet in which a forsterite film is not formed and oxides do not remain can be stably obtained. However, in the method of Patent Document 10, since a forsterite film is not formed and a surface of the steel sheet becomes smooth, there is room for improvement in adhesion of the insulation coating.

For example, Patent Document 11 discloses a method of forming an externally oxidized layer formed of silica having a film thickness of 2 nm or more and 500 nm or less at an interface between a tension-applying insulation coating and a grain-oriented silicon steel sheet so that sufficient coating adhesion can be obtained with respect to the final-annealed grain-oriented silicon steel sheet having no inorganic mineral film.

However, in order to form the externally oxidized layer, it is necessary to perform heat treatment or the like before forming the insulation coating, and thus productivity decreases.

CITATION LIST

Patent Document

[Patent Document 1]
Japanese Unexamined Patent Application, First Publication No. S48-39338
[Patent Document 2]
Japanese Unexamined Patent Application, First Publication No. S49-96920
[Patent Document 3]
U.S. Pat. No. 3,785,882.
[Patent Document 4]
Japanese Unexamined Patent Application, First Publication No. S56-65983
[Patent Document 5]
Japanese Examined Patent Application, Second Publication No. S48-19050
[Patent Document 6]
Japanese Examined Patent Application, Second Publication No. S56-3414
[Patent Document 7]
Japanese Examined Patent Application, Second Publication No. S58-44152
[Patent Document 8]
Japanese Unexamined Patent Application, First Publication No. H7-18457
[Patent Document 9]
Japanese Unexamined Patent Application, First Publication No. S59-96278
[Patent Document 10]
Japanese Patent No. 4184809
[Patent Document 11]
Japanese Patent No. 4473489

SUMMARY OF THE INVENTION

Problems to be Solved by the Invention

In view of the current state of the conventional technologies described above, an object of the present invention is to provide a grain-oriented electrical steel sheet having no forsterite film on a surface of a steel sheet to significantly reduce iron loss and having excellent adhesion between an insulation coating and the steel sheet, and a manufacturing method of the same.

Means for Solving the Problem

As described above, in the grain-oriented electrical steel sheet, the forsterite film is effective for applying tension to the steel sheet, but on the other hand, it also has an aspect of diminishing an effect of improving iron loss due to the film tension. Therefore, in order to further improve the iron loss, it is preferable to form an insulation coating that applies tension to the steel sheet that does not have a forsterite film on the surface. However, when there is no forsterite film on a surface of the steel sheet, coating adhesion of the insulation coating decreases.

As a result of studies by the present inventors on the premise of applying a manufacturing method that does not require formation of an externally oxidized layer, it has been found that, when a spinel ($MgO.Al_2O_3$) is formed on the steel sheet at an interface between the steel sheet and the coating, adhesion of the insulation coating can be improved even when there is no forsterite film and there is no intermediate layer such as an oxide layer between the steel sheet and the insulation coating. Also, it has been found that it is important to appropriately select an annealing separator to be used during final annealing when a grain-oriented electrical steel sheet without a forsterite film and with a spinel is obtained.

The present invention has been made on the basis of the above-described findings. The gist of the present invention is as follows.

(1) A grain-oriented electrical steel sheet including a steel sheet, an insulation coating disposed on the steel sheet, and a spinel present at a part on the steel sheet at an interface between the steel sheet and the insulation coating by being fitted into the insulation coating, in which an amount of the spinel is 5 to 50 $mg/m^2$ per unit area of a surface of the steel sheet.

(2) A manufacturing method of a grain-oriented electrical steel sheet, which is a manufacturing method of the grain-oriented electrical steel sheet according to (1) described above, including an annealing separator applying process in which an annealing separator containing $Al_2O_3$ and MgO is applied to a decarburization-annealed steel sheet, a final annealing process in which final annealing is performed on the steel sheet, a powder removing process in which a surplus annealing separator on a surface of the steel sheet after the final annealing process is removed, and an insulation coating forming process in which the steel sheet after the powder removing process is coated with a coating liquid containing colloidal silica and is baked to form an insulation coating on the steel sheet, in which the $Al_2O_3$ is formed of a mixed phase containing a κ phase and an α phase, a BET specific surface area of the MgO is 5.0 $m^2/g$ or less, and a proportion of a weight of the MgO in a total weight of the $Al_2O_3$ and the MgO is 5 to 50%.

(3) The manufacturing method of a grain-oriented electrical steel sheet according to (2) described above, in which a proportion of the κ phase in the $Al_2O_3$ is 5.0 to 50.0% by mass.

(4) The manufacturing method of a grain-oriented electrical steel sheet according to (2) or (3) described above, in which an application amount of the annealing separator in the annealing separator applying process is 5 to 20 $g/m^2$.

Effects of the Invention

Since the grain-oriented electrical steel sheet of the present invention does not have a forsterite film on a surface of the steel sheet, excellent magnetic characteristics can be obtained. Also, since there is a spinel (convex spinel) formed to be fitted into the insulation coating at an interface between the steel sheet and the insulation coating, adhesion between the steel sheet and the insulation coating is excellent.

Also, according to the manufacturing method of the grain-oriented electrical steel sheet, it is possible to provide a grain-oriented electrical steel sheet having excellent magnetic characteristics and coating adhesion.

EMBODIMENTS FOR IMPLEMENTING THE INVENTION

First, a grain-oriented electrical steel sheet according to one embodiment of the present invention (a grain-oriented electrical steel sheet according to the present embodiment) and a manufacturing method of the same will be described with reference to the drawings.

Figure 1:
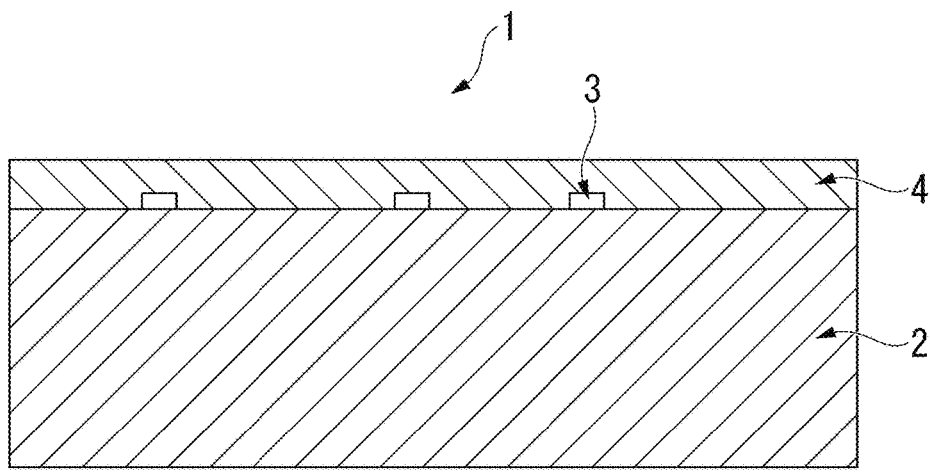
FIG. 1 is a schematic view illustrating a grain-oriented electrical steel sheet according to the present embodiment.

As illustrated in FIG. 1, a grain-oriented electrical steel sheet 1 according to the present embodiment includes a steel sheet 2, an insulation coating 4 formed on the steel sheet 2, and a spinel 3 formed to be fitted into the insulation coating 4 at a part of an interface between the steel sheet 2 and the insulation coating 4. In the present embodiment, an annealing separator containing $Al_2O_3$ and MgO is applied before final annealing, and a forsterite film is not formed between the steel sheet 2 and the insulation coating 4. Also, although the spinel 3 is formed at a part of the interface between the steel sheet 2 and the insulation coating 4, an intermediate layer such as an oxide layer is not formed.

Hereinafter, each of the steel sheet 2, the spinel 3, and the insulation coating 4 included in the grain-oriented electrical steel sheet 1 according to the present embodiment will be described in detail.

<Steel Sheet>

Components of the steel sheet 2 are not particularly limited as long as they are within a range applicable to normal grain-oriented electrical steel sheets. As a steel sheet having a chemical composition from which preferable characteristics as a grain-oriented electrical steel sheet can be obtained after an insulation coating is formed, a steel sheet containing, for example, 0.085% by mass or less of C, 0.80 to 7.00% by mass of Si, 1.00% by mass or less of Mn, 0.065% by mass or less of Al, 0.013% by mass or less of S, 0 to 0.80% by mass of Cu, 0 to 0.012% by mass of N, 0 to 0.5% by mass of P, 0 to 1.0% by mass of Ni, 0 to 0.3% by mass of Sn, and 0 to 0.3% by mass of Sb, and including remainder of Fe and impurities can be exemplified.

The components of the steel sheet 2 described above may be measured using a general analysis method of a steel. For example, the components of the steel sheet 2 may be measured using an inductively coupled plasma-atomic emission spectrometry (ICP-AES). C and S may be measured using a combustion-infrared absorption method, and N may be measured using an inert gas fusion-thermal conductivity method.

<Spinel>

As described in Patent Document 10, it is generally aimed that oxides or the like does not remain on a surface of a steel sheet. On the other hand, when a forsterite film is not formed and oxides or the like do not remain on a surface of the steel sheet 2, since the surface of the steel sheet 2 becomes smooth, there is a problem in that sufficient adhesion between the steel sheet 2 and the insulation coating 4 cannot be obtained. The present inventors have conducted various studies on a method for improving adhesion between the steel sheet 2 on which a forsterite film is not formed before the insulation coating 4 is formed and the insulation coating 4. As a result, it has been newly found that the adhesion between the steel sheet 2 and the insulation coating 4 can be improved by forming the spinel 3 on a surface of the steel sheet 2 before the insulation coating 4 is formed. Specifically, it is as follows.

Figure 3:
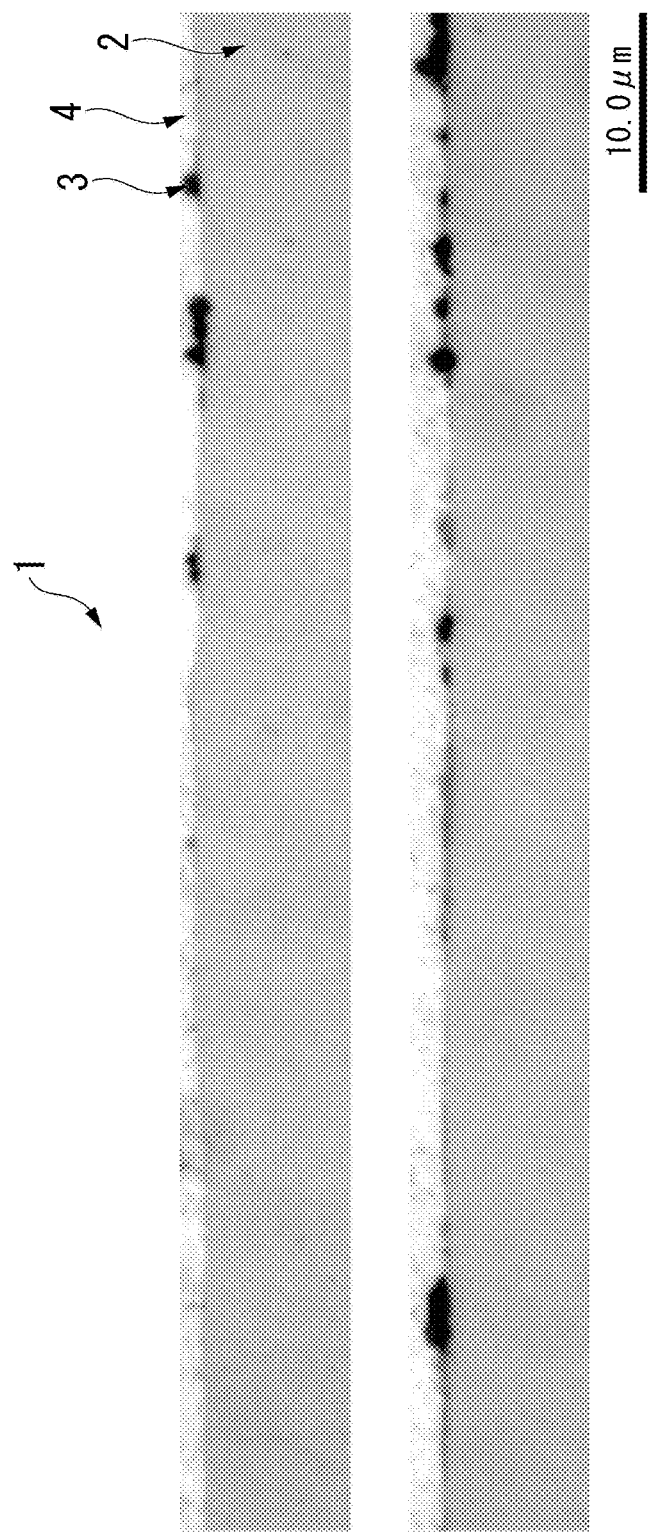
FIG. 3 is an example in which a cross section of the grain-oriented electrical steel sheet according to the present embodiment is observed with an optical microscope.

In the grain-oriented electrical steel sheet 1 according to the present embodiment, the spinel 3 having a joint committee on powder diffraction standards (JCPDS) number 21-1152 identified from a diffraction pattern by a wide-angle X-ray diffraction method and represented by $MgAl_2O_4$ is formed at a part on a surface of the steel sheet 2 at the interface between the steel sheet 2 and the insulation coating 4. As illustrated in FIG. 3, the spinel 3 is adhered on a surface of the steel sheet 2 and formed to protrude from the steel sheet 2 toward the insulation coating 4 to be formed later. As a result, the spinel 3 is formed in a form in which it is fitted into the insulation coating 4 after the insulation coating 4 is formed. In the present embodiment, "being fitted into" indicates a state in which the spinel 3 has entered the insulation coating 4 from the interface between the insulation coating 4 and the steel sheet 2 in a sheet thickness direction of the steel sheet 2 as illustrated in FIG. 1. On the other hand, as illustrated in FIG. 3, the spinel 3 is not fitted into the steel sheet 2 side in the grain-oriented electrical steel sheet 1 according to the present embodiment.

In the present embodiment, the spinel 3 formed in this way is referred to as a "convex spinel" in some cases.

Figure 2:
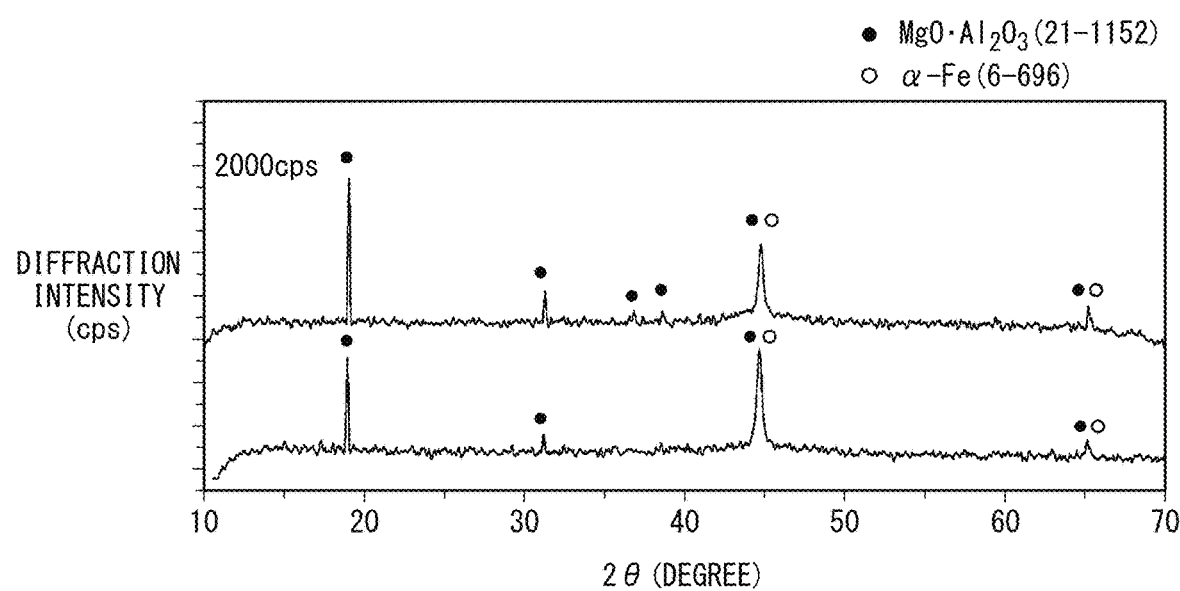
FIG. 2 is an example of a wide-angle X-ray diffraction chart of the grain-oriented electrical steel sheet according to the present embodiment (a wide-angle X-ray diffraction chart (two examples) indicating that a product on a surface of a steel sheet is a spinel).

Also, FIG. 2 is an example of a wide-angle X-ray diffraction chart of the grain-oriented electrical steel sheet according to the present embodiment.

In the grain-oriented electrical steel sheet 1 according to the present embodiment, although the surface of the steel sheet 2 is smooth and a forsterite film is not formed, adhesion of the insulation coating 4 can be improved by forming the spinel 3 (convex spinel) on the surface of the steel sheet 2 as described above.

In order to obtain an effect of improving coating adhesion, it is necessary to have the spinel 3 (convex spinel) present at 5 to 50 $mg/m^2$ per unit area of the surface of the steel sheet 2. Even if the spinel 3 (convex spinel) is formed, when an amount thereof is less than 5 $mg/m^2$, the effect of improving coating adhesion cannot be sufficiently obtained. On the other hand, when an amount of the spinel 3 (convex spinel) per unit area of the surface of the steel sheet 2 exceeds 50 $mg/m^2$, the spinel 3 is also formed to be fitted into the inside of the steel sheet 2. In this case, iron loss increases (deteriorates). Therefore, the amount of the spinel 3 (convex spinel) is set to 5 to 50 $mg/m^2$ per one side of the steel sheet.

As will be described below, the spinel 3 is formed by applying an annealing separator containing MgO and $Al_2O_3$ which has a κ phase and an α phase to a decarburization-annealed steel sheet, and then performing final annealing. Due to the final annealing, an intermediate steel sheet including the steel sheet 2 and the spinel 3 formed at a part on the steel sheet 2 and having the spinel 3 content of 5 to 50 $mg/m^2$ can be obtained.

Also, when the insulation coating 4 is formed on the intermediate steel sheet, the grain-oriented electrical steel sheet 1 according to the present embodiment can be obtained.

The spinel 3 content per unit area of the surface of the steel sheet 2 can be obtained by the following method.

First, the steel sheet 2 having the spinel 3 and the insulation coating 4 is immersed in a sodium hydroxide aqueous solution having a concentration of 40% heated to 85° C. for 20 minutes. Next, the surface of the steel sheet is wiped with a rag (cloth) under running water and then is thoroughly washed with the running water. Finally, the steel sheet 2 is passed through a dryer to dry moisture. Due to a series of these operations, the insulation coating 4 is removed, and the steel sheet 2 and the spinel 3 on the steel sheet 2 remain. For the steel sheet 2 having the spinel 3, a crystal phase is identified and it is ascertained that the spinel 3 has been formed while there is no alumina using the wide-angle X-ray diffraction method.

For a condition in which presence of alumina is not ascertained and formation of the spinel 3 is ascertained, a residue on the surface of the steel sheet 2 is collected by a chemical dissolution method using a $Br_2/CH_3OH$ solution or the like to prepare a uniform solution in which the residue is dissolved, and then an amount of the $Al_2O_3$ is calculated by an ICP method. Next, the calculated amount of the $Al_2O_3$ is multiplied by (molecular weight of spinel/molecular weight of $Al_2O_3$), that is, multiplied by "$(MgO.Al_2O_3)/Al_2O_3=142.3/102=1.4$", and thereby an amount of the spinel can be obtained. From the amount of the spinel and an area of the steel sheet 2 used for calculating the amount of the spinel, the spinel 3 content per unit area of the surface of the steel sheet 2 can be obtained.

In the present invention, since $Al_2O_3$ component is not present in the steel sheet 2 other than the spinel 3, the spinel 3 content per unit area of the surface of the steel sheet 2 can be obtained using the above-described method.

In a condition in which presence of alumina has been ascertained by the wide-angle X-ray diffraction method, increase in iron loss occurs due to the alumina hindering domain wall motion, increase in amount of the insulation coating occurs due to the presence of the alumina, and increase in iron loss occurs due to decrease in space factor due to increase in unevenness on the surface of the steel sheet 2. Therefore, it is preferable that the alumina be not present in the steel sheet 2. Therefore, it is preferable to confirm presence or absence of alumina prior to the above-described ICP analysis. The presence or absence of alumina can be ascertained by the wide-angle X-ray diffraction method as described above.

Further, when the annealing separator mainly composed of alumina does not contain MgO, or when a proportion of a weight of the MgO in a total weight of the $Al_2O_3$ and the MgO is less than 5%, presence of alumina is ascertained. In such cases, since the alumina contained in the annealing separator is seized on the steel sheet, even if the steel sheet after final annealing is washed with water or subjected to pickling, the alumina cannot be removed and the alumina remains on the surface of the steel sheet.

Also, an existence form of the spinel 3 (whether or not it has a convex shape) can be determined from an optical microscope image of a cross section in a sheet thickness direction.

Specifically, the steel sheet 2 including the spinel 3 and the insulation coating 4 is immersed in a sodium hydroxide aqueous solution having a concentration of 40% heated to 85° C. for 20 minutes. Next, the surface of the steel sheet is wiped with a rag (cloth) under running water and then is thoroughly washed with the running water. Finally, the steel sheet 2 is passed through a dryer to dry moisture. Due to a series of these operations, the insulation coating 4 is removed, and the steel sheet 2 and the spinel 3 on the steel sheet 2 remain. An observation sample is taken from the steel sheet 2 having the spinel 3 so that a cross section in the sheet thickness direction becomes an observation surface, and the observation surface is polished. An image of the polished sample is captured using an optical microscope at a magnification of about 1000 times.

At the time of the observation, it is the steel sheet 2 that exhibits metallic reflection, and it is the spinel 3 that does not exhibit metallic reflection and looks black. From the observed image, if the spinel 3 that looks black is present on an outer side of the steel sheet 2 that exhibits metallic reflection, it can be determined that the spinel 3 is formed to be fitted (invaded) into the insulation coating 4.

<Insulation Coating>

The insulation coating 4 is formed on the steel sheet 2. When the spinel 3 is formed on a part of the surface of the steel sheet 2, the insulation coating 4 is formed on the spinel 3 for that part. That is, the insulation coating 4 is formed on the steel sheet 2 and the spinel 3.

The insulation coating 4 is an insulation coating formed by applying a coating liquid mainly composed of phosphate and colloidal silica ($SiO_2$) and then baking. Due to this insulation coating 4, a strong surface tension can be applied to the steel sheet 2 serving as a base material.

In the grain-oriented electrical steel sheet 1 according to the present embodiment, coating adhesion of the insulation coating 4 is excellent even if an amorphous oxide layer ($SiO_2$ layer) formed of $SiO_2$ is not formed between the steel sheet 2 and the insulation coating 4. Therefore, the insulation coating 4 is basically formed directly on the steel sheet 2 and the spinel 3 without needing the $SiO_2$ layer. In the grain-oriented electrical steel sheet 1 according to the present embodiment, since a process for forming the $SiO_2$ layer is not necessary, it is also preferable from the perspective of productivity.

On the other hand, even when the amorphous oxide layer (not illustrated) formed of $SiO_2$ is formed between the insulation coating 4 and the steel sheet 2, the effect of improving coating adhesion of the insulation coating 4 due to the spinel 3 is not impaired. When the $SiO_2$ layer is formed, since the $SiO_2$ layer is formed on the steel sheet 2 but is not formed on the spinel 3, improvement in adhesion of the insulation coating 4 due to the spinel 3 is not impaired, and since the adhesion between the steel sheet 2 and the insulation coating 4 is improved at a portion in which the spinel 3 is not formed, the adhesion between the steel sheet 2 and the insulation coating 4 is further improved.

The grain-oriented electrical steel sheet 1 according to the present embodiment does not have a forsterite film on the steel sheet 2. Presence or absence of the forsterite film on the steel sheet 2 can be ascertained by analyzing the surface of the steel sheet from which the insulation coating 4 has been removed using the X-ray diffraction method. Specifically, an obtained X-ray diffraction spectrum is collated with a powder diffraction file (PDF). For example, JCPDS number: 34-189 may be used to determine presence or absence of the forsterite.

In the grain-oriented electrical steel sheet 1 according to the present embodiment, even if the surface of the steel sheet 2 from which the insulation coating 4 has been removed is analyzed by the X-ray diffraction method, a forsterite peak is not detected.

Next, a manufacturing method of the grain-oriented electrical steel sheet according to the present embodiment will be described.

The grain-oriented electrical steel sheet 1 according to the present embodiment can be obtained by a manufacturing method including the following processes (A) to (D).

(A) An annealing separator applying process in which an annealing separator containing $Al_2O_3$ and MgO is applied to a decarburization-annealed steel sheet.

(B) A final annealing process in which final annealing is performed on the steel sheet.

(C) A powder removing process in which an unreacted annealing separator on a surface of the steel sheet after the final annealing is removed.

(D) An insulation coating forming process in which the steel sheet after the powder removing process is coated with a coating liquid containing colloidal silica and is baked to form an insulation coating on the steel sheet.

Hereinafter, each process will be described.

<Annealing Separator Applying Process>

The present inventors investigated a relationship between the annealing separator applied to the steel sheet after decarburization annealing prior to the final annealing, and an amount and an existence form of the spinel 3 formed on the surface of the steel sheet after the final annealing. Specifically, first, a large number of primary recrystallized decarburization-annealed sheets were prepared. Various mixtures (annealing separators) of $Al_2O_3$ and MgO having different crystal systems were prepared into an aqueous slurry, applied to these decarburization-annealed sheets, and then dried. Next, the steel sheets on which the annealing separator had been applied were subjected to the final annealing in dry hydrogen at a soaking temperature of 1200° C. for a soaking time of 20 hours. After the final annealing, these steel sheets were washed with water to wash away an unreacted annealing separator.

Regarding the steel sheets 2 prepared in this way, crystal phases were identified using the wide-angle X-ray diffraction method, and for a condition in which presence of alumina was not ascertained and formation of the spinel 3 was ascertained, a residue on the surface of the steel sheet 2 was collected by a chemical dissolution method using a $Br_2/CH_3OH$ solution or the like to prepare a uniform solution in which the residue was dissolved, an amount of the $Al_2O_3$ was calculated using the ICP method thereafter, and this was converted into a spinel 3 content based on an area of the steel sheet 2 used for the calculation of the $Al_2O_3$.

Also, an existence form of the spinel 3 was determined by polishing a cross section in the sheet thickness direction of the steel sheet 2 in which the insulation coating 4 was melted and removed as described above, and then observing the spinel 3 at a magnification of 1000 times using an optical microscope.

Also, the steel sheet from which an unreacted annealing separator after the final annealing had been washed away was coated with a coating liquid containing Al phosphate and colloidal silica as main components and was baked at 835° C. for 30 seconds to form the insulation coating 4 applying tension to the steel sheet. The steel sheet 2 on which the insulation coating 4 was formed was pressed against a cylinder to have a bending diameter of 20 mm and then bent back, and peeling of the insulation coating 4 was observed to evaluate coating adhesion.

As a result, when the $Al_2O_3$ used in the annealing separator was formed of a mixed phase containing the κ phase and the α phase, a BET specific surface area of the MgO was 5.0 $m^2/g$ or less, and a proportion of a weight of the MgO in a total weight of the $Al_2O_3$ and the MgO was in a range of 5 to 50%, the spinel 3 had a convex shape with respect to the steel sheet 2, and adhesion of the insulation coating 4 was satisfactory.

As can be also found from the above-described experiment, in the annealing separator applying process, the annealing separator containing $Al_2O_3$ and MgO is applied to the decarburization-annealed steel sheet. At that time, in this annealing separator, the $Al_2O_3$ needs to be formed of a mixed phase containing the κ phase and the α phase, the BET specific surface area of the MgO needs to be 5.0 $m^2/g$ or less, and a proportion of a weight of the MgO in a total weight of the $Al_2O_3$ and the MgO needs to be in a range of 5 to 50%.

Since the grain-oriented electrical steel sheet contains a large amount of Si, a decarburization-annealed oxide layer containing $SiO_2$ is formed in the vicinity of the surface of the steel sheet after the decarburization annealing. This decarburization-annealed oxide layer is softened and melted in the final annealing process after the annealing separator is applied. At this time, when the annealing separator contains $Al_2O_3$ and does not contain MgO, in the vicinity of the surface of the steel sheet, most of the $SiO_2$ formed in the vicinity of the surface of the steel sheet during the decarburization annealing is adsorbed by the $Al_2O_3$, but some of the $SiO_2$ that could not have been adsorbed by the $Al_2O_3$ reacts with Al in the steel sheet (solid solution Al) to form mullite ($3Al_2O_3.2\ SiO_2$). In this case, a sufficient spinel is not formed. Also, this mullite serves as an obstacle to domain wall motion and causes deterioration in magnetic characteristics of the grain-oriented electrical steel sheet. On the other hand, when the annealing separator contains MgO and does not contain $Al_2O_3$, a forsterite film is formed on the steel sheet.

When the annealing separator contains $Al_2O_3$ and a predetermined amount of MgO, a forsterite film is not formed on the steel sheet and a spinel is formed. Also, formation of the mullite is suppressed.

In the annealing separator, when a proportion of a weight of the MgO in a total weight of the $Al_2O_3$ and the MgO is less than 5%, formation of the mullite is not sufficiently suppressed. On the other hand, when a proportion of a weight of the MgO in a total weight of the $Al_2O_3$ and the MgO exceeds 50%, a forsterite film is formed.

Also, when the $Al_2O_3$ in the annealing separator is formed of a mixed phase containing the κ phase and the α phase, formation of the mullite by the reaction of $SiO_2$ formed in the vicinity of the surface of the steel sheet 2 with Al in the steel sheet 2 (solid solution Al) can be effectively suppressed. When the $Al_2O_3$ does not contain the κ phase and is formed of, for example, a γ phase and the α phase, a certain effect can be obtained in preventing residual oxides on the surface of the steel sheet 2, but if an intermediate layer such as a thermal oxide $SiO_2$ layer is not formed, adhesion between the steel sheet 2 and the insulation coating 4 is insufficient, and this is not preferable.

When the above-described effect is more reliably obtained, a proportion of the κ phase in the $Al_2O_3$ is preferably 5.0 to 50.0% by mass. When there is a large amount of κ phase, there is concern that an excessive hydration reaction proceeds during preparation of an aqueous slurry of the annealing separator, moisture contained in alumina hydrate is released during the final annealing of the steel sheet coated with the aqueous slurry, and oxides are formed by the moisture. When a proportion of the κ phase in the $Al_2O_3$ is 50.0% by mass or less, the hydration reaction at the time of preparing the aqueous slurry of the annealing separator is suppressed, and formation of oxides during the final annealing of the steel sheet coated with the aqueous slurry can be suppressed. Also, when there is a small amount of κ phase in the $Al_2O_3$ of the annealing separator, there is concern that precipitates such as, for example, mullite may remain inside the steel sheet 2 after the final annealing. There is a likelihood that the residual precipitates serve as an obstacle to domain wall motion and cause deterioration in iron loss. When a proportion of the κ phase in the $Al_2O_3$ is 5.0% by mass or more, the residual precipitates inside the steel sheet 2 after final annealing can be suppressed.

Also, when the BET specific surface area of the MgO contained in the annealing separator exceeds 5.0 m$^2$/g, a hydration reaction proceeds at a stage of preparing the aqueous slurry of the annealing separator, moisture contained in magnesia hydrate is released during the final annealing, this moisture oxidizes the steel sheet 2, and thereby causing a decrease in adhesion of the insulation coating 4. Therefore, the BET specific surface area of the MgO contained in the annealing separator is set to 5.0 m$^2$/g or less. From the perspective of preventing the hydration reaction, the BET specific surface area of the MgO is preferably 2.0 m$^2$/g or less.

A BET specific surface area of the Al$_2$O$_3$ in the annealing separator is preferably 1 to 100 m$^2$/g. When the BET specific surface area is less than 1 m$^2$/g, this is not preferable because there is a likelihood that the Al$_2$O$_3$ will be seized. When the BET specific surface area of the Al$_2$O$_3$ is 1 m$^2$/g or more, seizure of the Al$_2$O$_3$ can be further suppressed. On the other hand, when the BET specific surface area exceeds 100 m$^2$/g, this is not preferable because there is a likelihood that the hydration reaction will proceed at the stage of preparing the aqueous slurry of the annealing separator, and moisture contained in the alumina hydrate will be released during the final annealing and oxidize the steel sheet 2. When the BET specific surface area of the Al$_2$O$_3$ is 100 m$^2$/g or less, the hydration reaction at the time of preparing the aqueous slurry of the annealing separator is suppressed, and the oxidation of the steel sheet 2 at the time of the final annealing can be suppressed.

A proportion of a weight of the MgO in the annealing separator can be determined by weighing the Al$_2$O$_3$ and the MgO to prepare the annealing separator when a mixture of the Al$_2$O$_3$ and the MgO is prepared into the aqueous slurry.

If Al$_2$O$_3$ containing the κ phase and the α phase is used as the Al$_2$O$_3$ when the annealing separator is prepared, although the Al$_2$O$_3$ in the annealing separator will be formed of a mixed phase including the κ phase and the α phase, whether or not the Al$_2$O$_3$ in the annealing separator is formed of the mixed phase including the κ phase and the α phase can also be ascertained by the following method using the prepared annealing separator.

An X-ray diffraction chart is collected over a range of about 2θ=10 to 70° with respect to the Al$_2$O$_3$ used for the annealing separator. Then, an interplanar distance is obtained for each diffraction line. Next, the obtained interplanar distance is collated with an interplanar distance of α-phase Al$_2$O$_3$ and an interplanar distance of κ-phase Al$_2$O$_3$ on the JCPDS card to ascertain presence or absence of each of the crystal phases.

The BET specific surface areas of the Al$_2$O$_3$ and the MgO contained in the annealing separator can be obtained using a general method for evaluating a surface area of an inorganic mineral powder and is obtained by the following method. The BET specific surface areas of the Al$_2$O$_3$ and the MgO are obtained by a method of measuring a surface area in which an inert gas such as argon is adsorbed on a particle surface and then pressures before and after the adsorption are measured.

An application amount of the annealing separator is not limited but is preferably 5 g/m$^2$ to 20 g/m$^2$. When the application amount is less than 5 g/m$^2$, the steel sheet cannot be sufficiently coated, and seizure between the steel sheets may occur during the final annealing. When the application amount of the annealing separator is 5 g/m$^2$ or more, seizure between the steel sheets during the final annealing can be prevented. On the other hand, when the application amount of the annealing separator is more than 20 g/m$^2$, a moisture amount brought in between the steel sheets increases. There is concern that this moisture will be released during the final annealing and cause oxidation of the steel sheet. When the application amount of the annealing separator is 20 g/m$^2$ or less, oxidation of the steel sheet can be suppressed.

A method of obtaining the decarburization-annealed steel sheet prior to the annealing separator applying process is not particularly limited. For example, a molten steel adjusted to a required component composition (chemical composition) is cast by a normal method (for example, continuous casting) to manufacture a slab for manufacturing a grain-oriented electrical steel sheet. Next, the slab is subjected to normal hot rolling to obtain a hot-rolled steel sheet, and the hot-rolled steel sheet is coiled into a hot-rolled coil. Next, the hot-rolled coil is recoiled to be subjected to hot-band annealing, and then subjected to one cold rolling or a plurality of times of cold rolling with intermediate annealing sandwiched therebetween to obtain a steel sheet having the same thickness as a final product. When the steel sheet after the cold rolling is subjected to the decarburization annealing, a decarburization-annealed steel sheet is obtained.

<Final Annealing Process>

In the final annealing process, final annealing is performed on the steel sheet coated with the above-described annealing separator. The final annealing is preferably performed with an annealing temperature (soaking temperature) of 1200° C. to 1250° C. and a soaking time of 5 to 20 hours. A spinel is formed on the steel sheet by the final annealing.

When the annealing temperature is lower than 1200° C., there is a likelihood that impurity elements such as N in the steel sheet may not be sufficiently purified, inclusions may be formed, and thereby magnetic deterioration may be caused. When the annealing temperature is 1200° C. or higher, more sufficient purification is performed, formation of inclusions is suppressed, and thereby magnetic deterioration can be suppressed. On the other hand, when the soaking temperature is higher than 1250° C., seizure between the steel sheets may occur even when the annealing separator is used. When the soaking temperature is 1250° C. or lower, seizure between the steel sheets can be further suppressed.

When the soaking time is less than 5 hours, there is a likelihood that impurity elements such as N in the steel sheet may not be sufficiently purified, inclusions may be formed, and thereby magnetic deterioration may be caused. When the soaking time is 5 hours or more, more sufficient purification is performed, formation of inclusions is suppressed, and thereby magnetic deterioration can be suppressed. On the other hand, when the soaking time exceeds 20 hours, this is not preferable because productivity decreases. When the soaking time is 20 hours or less, productivity can be maintained.

<Powder Removing Process>

In the powder removing process, a surplus annealing separator such as an unreacted annealing separator on a surface of the steel sheet is removed by washing with water or the like after the final annealing process is completed.

When the powder removing process is not performed and the surplus annealing separator is not sufficiently removed during the final annealing of the surface of the steel sheet, a space factor deteriorates and a performance of an iron core decreases.

<Insulation Coating Forming Process>

In the insulation coating forming process, the steel sheet 2 (the intermediate steel sheet having the steel sheet 2 and the spinel 3 on the steel sheet) after the powder removing process is coated with a coating liquid containing colloidal silica and is baked to form the insulation coating 4 on the steel sheet 2.

The coating liquid may further contain a phosphate such as aluminum phosphate, and chromic acid. A baking condition is not limited, but for example, baking at 835 to 870° C. for 20 to 100 seconds in an atmosphere containing 3 to 97% nitrogen or 3 to 97% hydrogen or combination thereof is exemplified. Further, the baking atmosphere may contain water vapor derived from moisture contained in the coating liquid that is generated during drying and baking of the coating liquid. Therefore, the baking atmosphere is not limited to a completely drying atmosphere, that is, a system containing no moisture.

<Magnetic Domain Control Process>

Magnetic domain control may be performed on a cold-rolled sheet, a decarburization-annealed sheet, a final-annealed sheet, or a grain-oriented electrical steel sheet on which an insulation coating is formed to reduce iron loss as necessary. A method of magnetic domain control is not limited to a specific method, but the magnetic domain control can be performed by, for example, laser irradiation, electron beam irradiation, etching, or a groove forming method by gears. Thereby, a grain-oriented electrical steel sheet with lower iron loss can be obtained.

EXAMPLE

Next, although examples of the present invention will be described, each condition of the examples is one condition example employed for ascertaining feasibility and effects of the present invention, and the present invention is not limited to the condition example. The present invention may employ various conditions as long as the object of the present invention is achieved without departing from the gist of the present invention.

Example 1

A primary recrystallized decarburization-annealed sheet (sheet thickness: 0.23 mm) having the chemical composition shown in Table 1-1 was coated with an annealing separator and was dried. Components of the decarburization-annealed sheet were measured using ICP-AES, C and S were measured using a combustion-infrared absorption method, and N was measured using an inert gas fusion-thermal conductivity method. The annealing separator contained $Al_2O_3$ and MgO and used an annealing separator in which a proportion of a weight of the MgO in a total weight of the $Al_2O_3$ and the MgO, and a BET specific surface area of the MgO were adjusted to the values shown in Table 2. Also, an X-ray diffraction chart was collected over a range of about 2θ=10 to 70° for the $Al_2O_3$ used in the annealing separator. Then, an interplanar distance was obtained for each diffraction line, and then the obtained interplanar distance was collated with an interplanar distance of α-phase $Al_2O_3$ and an interplanar distance of κ-phase $Al_2O_3$ on the JCPDS card to ascertain presence or absence of each of the crystal phases. As a result, the $Al_2O_3$ used for the annealing separator contained the κ phase and the α phase in No. B1 to B6 as shown in Table 2. On the other hand, the $Al_2O_3$ used for the annealing separator contained only the α phase and did not contained the κ phase in No. b1 to b3. Also, the $Al_2O_3$ used for the annealing separator contained the α phase and the γ phase and did not contain the κ phase in No. b4 to b6.

Next, the steel sheet coated with the annealing separator was subjected to final annealing at 1200° C. for 20 hours.

Next, the steel sheet after the final annealing was washed with water to wash away an unreacted annealing separator.

The steel sheet after the washing with water was coated with a coating liquid containing phosphate and colloidal silica and was baked at 850° C. for 30 seconds in an atmosphere of 90% by volume of nitrogen, 10% by volume of hydrogen, and (dew point+30°) C. to form an insulation coating.

Also, magnetic domain control was performed by irradiating the steel sheet (grain-oriented electrical steel sheet) on which the insulation coating had been formed with laser.

A result of analyzing the chemical composition of the steel sheet after the final annealing was as shown in Table 1-2.

TABLE 1-1

| Steel No. | Chemical composition (mass %) (remainder of Fe and impurities) | | | | | | | |
|---|---|---|---|---|---|---|---|---|
| | C | Si | Mn | P | S | Al | N | Other elements |
| A1 | 0.002 | 3.25 | 0.15 | 0.03 | 0.006 | 0.027 | 0.020 | Sn: 0.050 |
| A2 | 0.002 | 3.35 | 0.15 | 0.03 | 0.007 | 0.028 | 0.020 | Cu: 0.15 |
| A3 | 0.002 | 3.45 | 0.15 | 0.03 | 0.006 | 0.029 | 0.020 | B: 0.002 |

TABLE 1-2

| Steel No. | Chemical composition (mass %) (remainder of Fe and impurities) | | | | | | | |
|---|---|---|---|---|---|---|---|---|
| | C | Si | Mn | P | S | Al | N | Other elements |
| A1 | 0.002 | 3.25 | 0.15 | 0.03 | <0.001 | 0.001 | <0.001 | Sn: 0.050 |
| A2 | 0.002 | 3.35 | 0.15 | 0.03 | <0.001 | 0.001 | <0.001 | Cu: 0.15 |
| A3 | 0.002 | 3.45 | 0.15 | 0.03 | <0.001 | 0.001 | <0.001 | B: <0.001 |

A sample was taken from the grain-oriented electrical steel sheet obtained in this way, and a spinel content per unit area was measured for a spinel formed between the steel sheet and the insulation coating by the following methods.

Also, as characteristics, iron loss and coating adhesion were evaluated by the methods to be described below.

<Measurement of Spinel Content Per Unit Area>

The above-described sample was immersed in a sodium hydroxide aqueous solution having a concentration of 40% heated to 85° C. for 20 minutes. Next, a surface of the steel sheet was wiped with a rag (cloth) under running water and then thoroughly washed with the running water. Finally, the sample was passed through a dryer to dry the water. The insulation coating was removed by a series of these operations. For the steel sheet from which the insulation coating had been removed, a crystal phase was ascertained and presence or absence of spinel formation was ascertained using a wide-angle X-ray diffraction method. Thereafter, a residue on the surface of the steel sheet was collected by a chemical dissolution method using a $Br_2/CH_3OH$ solution or the like to prepare a uniform solution in which the residue was dissolved, and then an amount of the $Al_2O_3$ was calculated by an ICP method. The calculated amount of the $Al_2O_3$ was multiplied by (molecular weight of spinel/molecular weight of $Al_2O_3$) to obtain an amount of the spinel. A spinel content per unit area was obtained from the amount of the spinel and an area of the sample used for calculating the amount of the spinel.

In addition, for an example in which there is spinel, an existence form of the spinel was determined from an optical microscope image of a cross section in the sheet thickness direction.

Specifically, an observation sample was taken from the steel sheet from which the insulation coating had been removed so that the cross section in the sheet thickness direction became an observation surface, and the observation surface was polished. An image of the polished sample was captured using an optical microscope at a magnification of about 1000 times. From the observed image, if a spinel that looked black was present on an outer side of the steel sheet that exhibited metallic reflection, it was determined that a spinel was formed to be fitted (invaded) into the insulation coating.

The results are shown in Table 2.

<Iron Loss>

For a sample taken from the manufactured grain-oriented electrical steel sheet, iron loss $W_{17/50}$ (W/kg) at an excitation magnetic flux density of 1.7 T and a frequency of 50 Hz was measured by an Epstein test on the basis of JIS C 2550-1: 2000.

The results are shown in Table 2.

<Coating Adhesion>

Coating adhesion of the insulation coating was evaluated by an area fraction of remained coating when a test piece taken from the manufactured grain-oriented electrical steel sheet was wound around a cylinder having a diameter of 20 mm (bent by 180°) and then bent back. In the evaluation of the coating adhesion of the insulation coating, presence or absence of peeling in the insulation coating was visually determined. The coating adhesion was defined as AA when the area fraction of the coating not peeled off from the steel sheet (the area fraction of remained coating) was 95% or more, defined as A when the area fraction was 90% or more and less than 95%, defined as B when the area fraction was 50% or more and less than 90%, and defined as C when the area fraction was less than 50%. When the coating adhesion was A or higher (A or AA), it was determined that a sufficient coating adhesion could be obtained.

The results are shown in Table 2. In Table 2, an amount of convex spinel of "0 mg/m²" indicates that formation of spinel has not been ascertained by the wide-angle X-ray diffraction method.

As can be found from Table 2, when the $Al_2O_3$ used in the annealing separator was formed of a mixed phase containing the κ phase and the α phase, a BET specific surface area of the MgO was 5.0 m²/g or less, and a proportion of a weight of the MgO in a total weight of the $Al_2O_3$ and the MgO was 5 to 50%, the spinel was convex with respect to the steel sheet and the amount was in a range of 5 to 50 mg/m². As a result, adhesion of the insulation coating was satisfactory and iron loss was also excellent.

On the other hand, the $Al_2O_3$ in the annealing separator did not contain the κ phase in No. b5 and b6. As a result, a sufficient convex spinel was not formed, and the coating adhesion was low.

Also, the $Al_2O_3$ in the annealing separator did not contain the κ phase in No. b1 and b4. Also, the annealing separator did not contain MgO. In these examples, since the annealing separator did not contain MgO, the $Al_2O_3$ was violently seized on the steel sheet, and the $Al_2O_3$ remained on the surface of the steel sheet even after being washes with water after final annealing. As a result, although the coating adhesion was satisfactory due to increase in unevenness due to the $Al_2O_3$, iron loss was inferior.

Also, the $Al_2O_3$ in the annealing separator did not contain the κ phase in No. b2 and b3. In these examples, the spinel was excessively formed and the spinel was fitted not only into the insulation coating but also into the steel sheet. As a result, although the coating adhesion was satisfactory due to the spinel, iron loss was inferior.

TABLE 2

| | | | Annealing separator | | | | | Characteristics evaluation | | |
|---|---|---|---|---|---|---|---|---|---|---|
| | | | $Al_2O_3$ | | | MgO | | Convex spinel Amount (mg/m²) | Iron loss $W_{17/50}$ (W/kg) | Coating adhesion | Note |
| | | Steel No. | κ phase | α phase | γ phase | BET specific surface area (m²/g) | Weight proportion (%) | | | | |
| Invention example | B1 | A1 | contain | contain | — | 0.5 | 50 | 50 | 0.65 | A | |
| | B2 | A2 | contain | contain | — | 1.0 | 30 | 40 | 0.63 | A | |
| | B3 | A3 | contain | contain | — | 2.0 | 40 | 30 | 0.65 | A | |
| | B4 | A1 | contain | contain | — | 2.0 | 20 | 10 | 0.64 | A | |
| | B5 | A2 | contain | contain | — | 5.0 | 10 | 20 | 0.63 | A | |
| | B6 | A3 | contain | contain | — | 5.0 | 5 | 5 | 0.64 | A | |
| Comparative example | b1 | A1 | — | contain | — | — | 0 | 0 | 0.83 | A | Large amount of residual $Al_2O_3$, Satisfactory coating adhesion, Poor iron loss |
| | b2 | A2 | — | contain | — | 1.0 | 50 | 90 | 0.76 | A | Satisfactory coating adhesion, Poor iron loss |
| | b3 | A3 | — | contain | — | 2.0 | 40 | 150 | 0.80 | A | Satisfactory coating adhesion, Poor iron loss |
| | b4 | A1 | — | contain | contain | — | 0 | 0 | 0.77 | B | Large amount of residual $Al_2O_3$, Satisfactory coating adhesion to some extent, Poor iron loss |
| | b5 | A2 | — | contain | contain | 10.0 | 20 | 4 | 0.69 | C | Small amount of spinel, Poor coating adhesion |
| | b6 | A3 | — | contain | contain | 20.0 | 10 | 3 | 0.69 | C | Small amount of spinel, Poor coating adhesion |

Example 2

A grain-oriented electrical steel sheet was manufactured under the same conditions as in Example 1. However, in the present example, a proportion of the κ phase in the $Al_2O_3$ and an application amount of the annealing separator were changed.

A sample was taken from the obtained grain-oriented electrical steel sheet, an amount of the spinel formed between the steel sheet and the spinel was measured using the same method as in Example 1, and iron loss and coating adhesion were evaluated.

The results are shown in Table 3.

TABLE 3

| | | | Annealing separator | | | | | | Characteristics evaluation | |
|---|---|---|---|---|---|---|---|---|---|---|
| | | | $Al_2O_3$ | | | MgO | | | | |
| | | | κ phase | | | BET specific | Weight | Application | Spinel | Iron loss | |
| | Steel | | | | | surface area | proportion | amount | Content | $W_{17/50}$ | Coating |
| | No | No. | Ratio (%) | α phase | γ phase | ($m^2/g$) | (%) | ($g/m^2$) | ($mg/m^2$) | (W/kg) | adhesion |
| Invention example | C1 | A1 | contain 10.0 | contain | — | 1.0 | 50.0 | 5 | 15 | 0.65 | AA |
| | C2 | A2 | contain 5.0 | contain | — | 2.0 | 25.0 | 10 | 5 | 0.64 | A |
| | C3 | A3 | contain 50.0 | contain | — | 5.0 | 10.0 | 15 | 50 | 0.66 | A |
| | C4 | A1 | contain 25.0 | contain | — | 3.0 | 5.0 | 20 | 35 | 0.64 | AA |
| | C5 | A2 | contain 15.0 | contain | — | 0.5 | 20.0 | 10 | 20 | 0.63 | AA |

As shown in Table 3, it was found that the grain-oriented electrical steel sheets obtained under these conditions had low iron loss and excellent coating adhesion.

INDUSTRIAL APPLICABILITY

According to the present invention, a grain-oriented electrical steel sheet having excellent magnetic characteristics and excellent adhesion between a steel sheet and an insulation coating can be obtained. Therefore, industrial applicability is high.

BRIEF DESCRIPTION OF THE REFERENCE SYMBOLS

1 Grain-oriented electrical steel sheet
2 Steel sheet
3 Spinel (convex spinel)
4 Insulation coating

The invention claimed is:

1. A grain-oriented electrical steel sheet comprising:
a steel sheet;
an insulation coating disposed on the steel sheet; and
a spinel formed on a part on the steel sheet at an interface between the steel sheet and the insulation coating, wherein the spinel protrudes from the steel sheet toward the insulation coating, wherein
an amount of the spinel is 5 to 50 $mg/m^2$ per unit area of a surface of the steel sheet, and
wherein the grain-oriented steel sheet does not contain a forsterite film.

2. A manufacturing method of a grain-oriented electrical steel sheet, which is a manufacturing method of the grain-oriented electrical steel sheet according to claim 1, comprising:
an annealing separator applying process in which an annealing separator containing $Al_2O_3$ and MgO is applied to a decarburization-annealed steel sheet;
a final annealing process in which final annealing is performed on the steel sheet;
a powder removing process in which a surplus annealing separator on a surface of the steel sheet after the final annealing process is removed; and
an insulation coating forming process in which the steel sheet after the powder removing process is coated with a coating liquid containing colloidal silica and is baked to form an insulation coating on the steel sheet, wherein
the $Al_2O_3$ is formed of a mixed phase containing a κ phase and an α phase,
a BET specific surface area of the MgO is 5.0 $m^2/g$ or less, and
a proportion of a weight of the MgO in a total weight of the $Al_2O_3$ and the MgO is 5 to 50%.

3. The manufacturing method of a grain-oriented electrical steel sheet according to claim 2, wherein a proportion of the κ phase in the $Al_2O_3$ is 5.0 to 50.0% by mass.

4. The manufacturing method of a grain-oriented electrical steel sheet according to claim 3, wherein an application amount of the annealing separator in the annealing separator applying process is 5 to 20 $g/m^2$.

5. The manufacturing method of a grain-oriented electrical steel sheet according to claim 2, wherein an application amount of the annealing separator in the annealing separator applying process is 5 to 20 $g/m^2$.

* * * * *